US012646251B2

(12) United States Patent
Man et al.

(10) Patent No.: US 12,646,251 B2
(45) Date of Patent: Jun. 2, 2026

(54) GENERATING THREE-DIMENSIONAL POINT CLOUDS AND DEPTH MAPS OF OBJECTS WITHIN DIGITAL IMAGES UTILIZING HEIGHT MAPS AND PERSPECTIVE FIELD REPRESENTATIONS

(71) Applicant: Adobe Inc., San Jose, CA (US)

(72) Inventors: Yunze Man, Champaign, IL (US);
Jianming Zhang, Campbell, CA (US)

(73) Assignee: Adobe Inc., San Jose, CA (US)

( * ) Notice: Subject to any disclaimer, the term of this patent is extended or adjusted under 35 U.S.C. 154(b) by 239 days.

(21) Appl. No.: 18/410,541

(22) Filed: Jan. 11, 2024

(65) Prior Publication Data

US 2025/0232526 A1     Jul. 17, 2025

(51) Int. Cl.
 *G06T 17/00*     (2006.01)
 *G06T 7/60*     (2017.01)
 *G06T 7/80*     (2017.01)
 *G06V 10/74*     (2022.01)

(52) U.S. Cl.
 CPC .............. *G06T 17/00* (2013.01); *G06T 7/60* (2013.01); *G06T 7/80* (2017.01); *G06V 10/761* (2022.01); *G06T 2207/20084* (2013.01)

(58) Field of Classification Search
 CPC .. G06T 17/00; G06T 7/60; G06T 7/80; G06T 2207/20084; G06T 7/50; G06V 10/761
 See application file for complete search history.

(56) References Cited

U.S. PATENT DOCUMENTS

| | | | | |
|---|---|---|---|---|
| 2014/0340489 | A1* | 11/2014 | Medioni | ............... G06V 20/64 |
| | | | | 348/50 |
| 2021/0142497 | A1* | 5/2021 | Pugh | ....................... G06T 7/543 |
| 2023/0139772 | A1* | 5/2023 | Wang | ...................... G06N 3/08 |
| | | | | 345/419 |
| 2023/0281844 | A1* | 9/2023 | Shahar | ..................... G06T 7/50 |
| | | | | 383/106 |
| 2023/0306637 | A1 | 9/2023 | Zhang et al. | |

OTHER PUBLICATIONS

Lee et al.; "Single View Scene Scale Estimation using Scale Field;" 2023 IEEE/CVF Conference on Computer Vision and Pattern Recognition (CVPR); Jun. 17-24, 2023 (Year: 2023).*

(Continued)

*Primary Examiner* — Edward Martello
(74) *Attorney, Agent, or Firm* — Keller Preece PLLC

(57) ABSTRACT

The present disclosure relates to systems, non-transitory computer-readable media, and methods for estimating the three-dimensional geometry of an object in a digital image by modeling the ground, object, and camera simultaneously. In particular, in one or more embodiments, the disclosed systems receive a two-dimensional digital image portraying an object. Further, the systems generate, utilizing a dense representation neural network, an estimate of an object-ground relationship of the object portrayed in the two-dimensional digital image and an estimate of camera parameters for the two-dimensional digital image. Additionally, the systems generate, utilizing a perspective field guided pixel height reprojection model, one or more of a three-dimensional point cloud or a depth map of the object from the estimated object-ground relationship and the estimated camera parameters.

20 Claims, 8 Drawing Sheets

(56) References Cited

OTHER PUBLICATIONS

Liu, Ze, et al. "Swin transformer: Hierarchical vision transformer using shifted windows." Proceedings of the IEEE/CVF international conference on computer vision. (pp. 10012-10022) 2021. (Year: 2021).*

Man et al.; "Floating No More: Object-Ground Reconstruction from a Single Image;" arXiv:2407.18914v1 [cs.CV] Jul. 26, 2024 (Year: 2024).*

Abhishek Kar, Shubham Tulsiani, Joao Carreira, and Jitendra Malik. Category-specific object reconstruction from a single image. In CVPR, 2015.

Adam Paszke, Sam Gross, Francisco Massa, Adam Lerer, James Bradbury, Gregory Chanan, Trevor Killeen, Zeming Lin, Natalia Gimelshein, Luca Antiga, et al. Pytorch: An imperative style, high-performance deep learning library. In NeurIPS, 2019.

Albert Pumarola, Jordi Sanchez-Riera, Gary Choi, Alberto Sanfeliu, and Francesc Moreno-Noguer. 3DPeople: Modeling the geometry of dressed humans. In ICCV, 2019.

Angjoo Kanazawa, Shubham Tulsiani, Alexei A Efros, and Jitendra Malik. Learning category-specific mesh reconstruction from image collections. In ECCV, 2018.

Chaoyang Wang, Simon Lucey, Federico Perazzi, and Oliver Wang. Web stereo video supervision for depth prediction from dynamic scenes. In 3DV, 2019.

David Eigen, Christian Puhrsch, and Rob Fergus. Depth map prediction from a single image using a multi-scale deep network. NeurIPS, 2014.

David Marr. A computational investigation into the human representation and processing of visual information. Vision, 1982.

Enze Xie, Wenhai Wang, Zhiding Yu, Anima Anandkumar, Jose M Alvarez, and Ping Luo. Segformer: Simple and efficient design for semantic segmentation with transformers. NeurIPS, 2021.

Fayao Liu, Chunhua Shen, Guosheng Lin, and Ian Reid. Learning depth from single monocular images using deep convolutional neural fields. TPAMI, 2015.

Ilya Loshchilov and Frank Hutter. Decoupled weight decay regularization. ICLR, 2017.

Jeremy Reizenstein, Roman Shapovalov, Philipp Henzler, Luca Sbordone, Patrick Labatut, and David Novotny. Common Objects in 3D: Large-scale learning and evaluation of real-life 3D category reconstruction. In ICCV, 2021.

Jiajun Wu, Chengkai Zhang, Xiuming Zhang, Zhoutong Zhang, William T Freeman, and Joshua B Tenenbaum. Learning shape priors for single-view 3d completion and reconstruction. In ECCV, 2018.

Jinwoo Lee, Hyunsung Go, Hyunjoon Lee, Sunghyun Cho, Minhyuk Sung, and Junho Kim. Ctrl-c: Camera calibration transformer with line-classification. In ICCV, 2021.

Jonathan Deutscher, Michael Isard, and John MacCormick. Automatic camera calibration from a single manhattan image. In ECCV, 2002.

Ke Xian, Chunhua Shen, Zhiguo Cao, Hao Lu, Yang Xiao, Ruibo Li, and Zhenbo Luo. Monocular relative depth perception with web stereo data supervision. In CVPR, 2018.

Lars Mescheder, Michael Oechsle, Michael Niemeyer, Sebastian Nowozin, and Andreas Geiger. Occupancy networks: Learning 3D reconstruction in function space. In CVPR, 2019.

Lawrence G Roberts. Machine perception of three dimensional solids. PhD thesis, MIT, 1963.

Linyi Jin, Jianming Zhang, Yannick Hold-Geoffroy, Oliver Wang, Kevin Matzen, Matthew Sticha, and David F Fouhey. Perspective Fields for Single Image Camera Calibration. arXiv, 2022.

Nanyang Wang, Yinda Zhang, Zhuwen Li, Yanwei Fu, Wei Liu, and Yu-Gang Jiang. Pixel2Mesh: Generating 3D mesh models from single RGB images. In ECCV, 2018.

Rene Ranftl, Katrin Lasinger, David Hafner, Konrad Schindler, and Vladlen Koltun. Towards robust monocular depth estimation: Mixing datasets for zero-shot cross-dataset transfer. TPAMI, 2020.

Scott Workman, Connor Greenwell, Menghua Zhai, Ryan Baltenberger, and Nathan Jacobs. Deepfocal: A method for direct focal length estimation. In ICIP, 2015.

Shubham Goel, Angjoo Kanazawa, and Jitendra Malik. Shape and viewpoint without keypoints. In ECCV, 2020.

Shunsuke Saito, Tomas Simon, Jason Saragih, and Hanbyul Joo. PIFuHD: Multi-level pixel-aligned implicit function for high-resolution 3D human digitization. In Proceedings of the IEEE/CVF Conference on Computer Vision and Pattern Recognition, pp. 84-93, 2020.

Shunsuke Saito, Zeng Huang, Ryota Natsume, Shigeo Morishima, Angjoo Kanazawa, and Hao Li. PIFu: Pixel-aligned implicit function for high-resolution clothed human digitization. In ICCV, 2019.

Thomas J Cashman and Andrew W Fitzgibbon. What shape are dolphins? building 3d morphable models from 2d images. TPAMI, 2012.

Tsung-Yi Lin, Michael Maire, Serge Belongie, James Hays, Pietro Perona, Deva Ramanan, Piotr Dollar, and C Lawrence Zitnick. Microsoft COCO: Common objects in context. In ECCV, 2014.

Wei Yin, Jianming Zhang, Oliver Wang, Simon Niklaus, Long Mai, Simon Chen, and Chunhua Shen. Learning to recover 3d scene shape from a single image. In CVPR, 2021.

Wei Yin, Yifan Liu, Chunhua Shen, and Youliang Yan. Enforcing geometric constraints of virtual normal for depth prediction. In ICCV, 2019.

Weifeng Chen, Shengyi Qian, and Jia Deng. Learning single-image depth from videos using quality assessment networks. In CVPR, 2019.

Weifeng Chen, Shengyi Qian, David Fan, Noriyuki Kojima, Max Hamilton, and Jia Deng. Oasis: A large-scale dataset for single image 3d in the wild. In CVPR, 2020.

Weifeng Chen, Zhao Fu, Dawei Yang, and Jia Deng. Single-image depth perception in the wild. NeurIPS, 2016.

Wenhai Wang, Enze Xie, Xiang Li, Deng-Ping Fan, Kaitao Song, Ding Liang, Tong Lu, Ping Luo, and Ling Shao. Pvt v2: Improved baselines with pyramid vision transformer. CVMJ, 2022.

Wenhai Wang, Enze Xie, Xiang Li, Deng-Ping Fan, Kaitao Song, Ding Liang, Tong Lu, Ping Luo, and Ling Shao. Pyramid vision transformer: A versatile backbone for dense prediction without convolutions. In ICCV, 2021.

Wenqi Xian, Zhengqi Li, Matthew Fisher, Jonathan Eisenmann, Eli Shechtman, and Noah Snavely. Uprightnet: geometry-aware camera orientation estimation from single images. In ICCV, 2019.

Xueting Li, Sifei Liu, Kihwan Kim, Shalini De Mello, Varun Jampani, Ming-Hsuan Yang, and Jan Kautz. Self-supervised single-view 3d reconstruction via semantic consistency. In ECCV, 2020.

Yannick Hold-Geoffroy, Kalyan Sunkavalli, Jonathan Eisenmann, Matthew Fisher, Emiliano Gambaretto, Sunil Hadap, and Jean-Francois Lalonde. A perceptual measure for deep single image camera calibration. In CVPR, 2018.

Yen-Chi Cheng, Hsin-Ying Lee, Sergey Tulyakov, Alexander Schwing, and Liangyan Gui. SDFusion: Multimodal 3D Shape Completion, Reconstruction, and Generation. CVPR, 2023.

Yichen Sheng, Yifan Liu, Jianming Zhang, Wei Yin, A Cengiz Oztireli, He Zhang, Zhe Lin, Eli Shechtman, and Bedrich Benes. Controllable Shadow Generation Using Pixel Height Maps. In ECCV, 2022.

Yufei Ye, Abhinav Gupta, and Shubham Tulsiani. What's in your hands? 3d reconstruction of generic objects in hands. In Proceedings of the IEEE/CVF Conference on Computer Vision and Pattern Recognition, pp. 3895-3905, 2022.

Yufei Ye, Shubham Tulsiani, and Abhinav Gupta. Shelf supervised mesh prediction in the wild. In CVPR, 2021.

Yunze Man, XinshuoWeng, Xi Li, and Kris Kitani. Groundnet: Monocular ground plane normal estimation with geometric consistency. In ACMMM, 2019.

Zhengqi Li and Noah Snavely. Megadepth: Learning singleview depth prediction from internet photos. In CVPR, 2018.

Zhengyou Zhang. A flexible new technique for camera calibration. TPAMI, 2000.

* cited by examiner

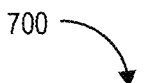

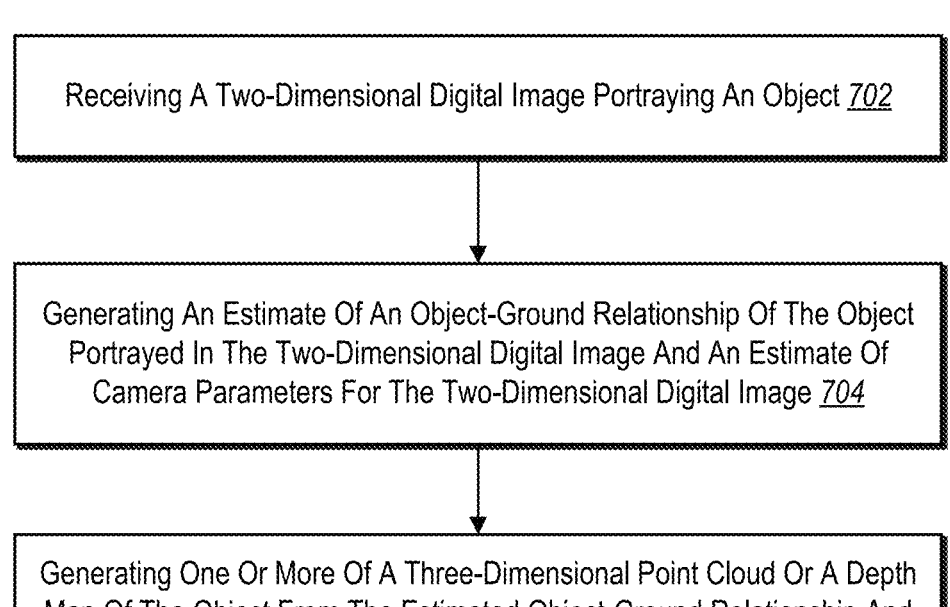

Receiving A Two-Dimensional Digital Image Portraying An Object _702_

Generating An Estimate Of An Object-Ground Relationship Of The Object Portrayed In The Two-Dimensional Digital Image And An Estimate Of Camera Parameters For The Two-Dimensional Digital Image _704_

Generating One Or More Of A Three-Dimensional Point Cloud Or A Depth Map Of The Object From The Estimated Object-Ground Relationship And The Estimated Camera Parameters _706_

*Fig. 7*

GENERATING THREE-DIMENSIONAL POINT CLOUDS AND DEPTH MAPS OF OBJECTS WITHIN DIGITAL IMAGES UTILIZING HEIGHT MAPS AND PERSPECTIVE FIELD REPRESENTATIONS

BACKGROUND

Recent years have seen significant improvements in software platforms for deriving information from digital images that has long been inaccessible. Indeed, as the use of digital images has become increasingly more common, systems have developed to facilitate the prediction of three-dimensional measurements from two-dimensional digital imagery. To illustrate, systems can utilize multi-view digital imagery of an object to estimate three-dimensional geometry of the object. Although conventional systems can estimate three-dimensional geometry of an object from a digital image using multiple views of the object, they have a number of technical deficiencies with regard to estimating three-dimensional object geometry from a single image.

SUMMARY

Embodiments of the present disclosure provide benefits and/or solve one or more of the foregoing or other problems in the art with systems, non-transitory computer-readable media, and methods for estimating the three-dimensional geometry of an object in a digital image by modeling the ground, object, and camera simultaneously. The disclosed systems also generate three-dimensional representations, including point clouds and depth maps, of the object. In particular, the disclosed systems estimate three-dimensional geometry of an object from an in-the-wild image. For example, an image having varied geometry and texture of objects in real-world scenarios, intertwined with unknown object-ground relationships, camera pose, and focal length. Further, the disclosed systems estimate the pose of the object relative to the ground by generating pixel height maps of objects and backgrounds in the digital image. Moreover, the disclosed systems infer camera parameters by generating vertical and latitude dense fields from a digital image. Furthermore, in one or more embodiments, the disclosed systems simultaneously optimize for the pixel height maps and the dense fields, resulting in simultaneous inference of the three-dimensional shape of the object, the camera's pose relative to the ground, and the relationship between the object and the ground. In addition, the disclosed systems generate depth maps and point clouds from the estimated parameters.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 7 illustrates an example series of acts 700 for estimating the three-dimensional geometry of an object in a digital image and generating three-dimensional representations of the object in accordance with one or more embodiments;

DETAILED DESCRIPTION

Figure 1:
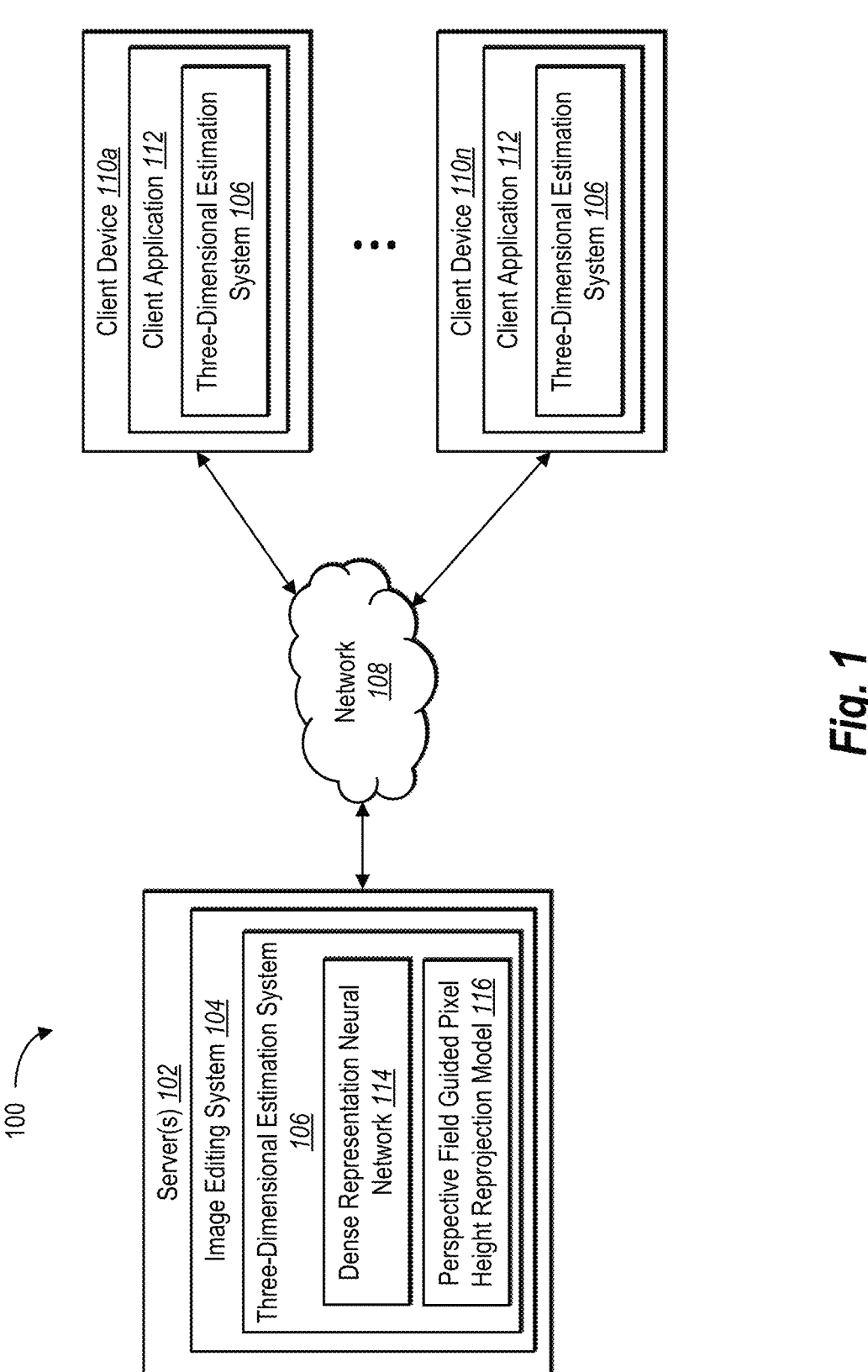
FIG. 1 illustrates a diagram of an environment in which a three-dimensional estimation system operates in accordance with one or more embodiments.

This disclosure describes one or more embodiments of a three-dimensional estimation system that estimates the three-dimensional geometry of an object in a digital image by modeling the ground, object, and camera simultaneously. The three-dimensional estimation system also generates three-dimensional representations, including point clouds and depth maps, of the object. For instance, the three-dimensional estimation system estimates the pose of the object relative to the ground by generating pixel height maps of the object portrayed in the digital image. Moreover, in one or more embodiments, the three-dimensional estimation system infers camera parameters by generating a perspective field representation of the object represented in the digital image. Additionally, in one or more embodiments, the three-dimensional estimation system simultaneously optimizes for the pixel height map and the perspective field representation, resulting in simultaneous inference of the three-dimensional shape of the object, the camera's pose relative to the ground, and the relationship between the object and the ground. In addition, the three-dimensional estimation system generates one or more of three-dimensional point clouds or depth maps from the estimated representations.

In particular, the three-dimensional estimation system estimates three-dimensional information of an object in a digital image and from that information generates point clouds or depth maps from a single image. For example, the three-dimensional estimation system estimates the three-dimensional geometry of an object from a single image having varied geometry and texture of objects in real-world scenarios, intertwined with unknown object-ground relationships, camera pose, and focal length.

Further, in one or more embodiments, the three-dimensional estimation system utilizes a dense representation neural network to estimate the three-dimensional information of an object represented in a digital image. For example, the three-dimensional estimation system utilizes a dense representation neural network to generate a pixel height map representing the pixel distances between points on an object portrayed in a digital image and its ground projection, or the object's vertical projection on the ground in the digital image. Additionally, in one or more embodiments, the three-dimensional estimation system utilizes the dense representation neural network to generate a perspective field representation comprising a latitude field and an up-vector field. Furthermore, the three-dimensional estimation system generates the pixel height map and the perspective field representation simultaneously utilizing a transformer-based encoder.

The three-dimensional estimation system estimates three-dimensional information, such as an object-ground relationship and camera parameters, from the pixel height map and the dense field representation. Indeed, the three-dimensional estimation system, in one or more implementations, estimates camera parameters from the latitude field and up-vector field of the perspective field representation of the object while simultaneously estimating an object-ground relationship of the object and its background in the digital image. For example, the three-dimensional estimation system estimates one or more of an elevation angle, a roll angle, a field-of-view, an extrinsic rotation matrix, a focal length, or an intrinsic matrix of the camera as the camera parameters.

Additionally, the three-dimensional estimation system utilizes a perspective field guided pixel height reprojection model to generate point clouds and depth maps from the estimated three-dimensional information in the pixel height map and perspective field representation. For example, the three-dimensional estimation system utilizes the perspective field guided pixel height reprojection model to generate point clouds from the estimated camera parameters and the object-ground relationship by projecting two-dimensional points from the object into three dimensions.

Although conventional systems utilize multi-view digital imagery of an object to estimate three-dimensional geometry of the object, such systems have a number of problems in relation to accuracy and flexibility of operation when using a single digital image for such estimates. For instance, conventional systems typically lack the flexibility to recover three-dimensional information of an object from an in-the-wild, single-view image without the need for large-scale training and camera parameter assumptions. Specifically, many conventional systems aim to recover the three-dimensional information from objects in digital images by directly estimating the pixel-level depth values. To directly estimate the pixel-level depth values on objects from in-the-wild, single-view digital images, these conventional models require training with large-scale datasets. Further, to project the three-dimensional information estimated from this direct estimation of the pixel-level depth values into three-dimensional point clouds, additional camera parameters are required which conventional systems typically cannot provide. Conventional systems often compensate for this inability to provide additional camera parameters by utilizing generic, rough estimations of these parameters or assuming a simple orthographic camera model to avoid over-complication of the problem, each of which significantly limits the flexibility of these systems in uncontrolled environments.

Further, conventional systems often inaccurately reconstruct three-dimensional information taken from single-view, in-the-wild digital images. In particular, conventional systems typically cannot compensate for shifts in depth maps, which cause distortion in three-dimensional reconstruction. Such shifts are often inherent to in-the-wild images and cannot be compensated for by applying generic, rough estimations of camera parameters or assuming simple orthographic models as mentioned above. Furthermore, conventional systems are often incapable of accurately placing recovered three-dimensional objects on a flat support plane due to an inability to preserve the object-ground relationship from the digital image. For instance, conventional systems generate three-dimensional models either floating or tilted on the ground.

The three-dimensional estimation system provides a variety of advantages relative to conventional systems. For example, by simultaneously inferring the three-dimensional shape of the object, the pose of the object relative to the ground, and the camera parameters the three-dimensional estimation system improves flexibility relative to conventional systems. Specifically, the three-dimensional estimation system accurately projects three-dimensional information of objects in a single-view, in-the-wild digital image into three-dimensional point clouds without needing to directly estimate pixel-level depth values and large-scale dataset training. Rather, the three-dimensional estimation system generates a pixel-level object-ground distance field also referred to as a pixel height map and combines it with a perspective field representation of a digital image. Simultaneously optimizing for these two representations is equivalent to estimating the three-dimensional shape of the object, the camera's pose relative to the ground, and the relationship between the object and the ground. As a result, the three-dimensional estimation system utilizes a perspective field guided pixel height reprojection model to accurately project the three-dimensional information therein into three-dimensional point clouds. Moreover, there is no need to utilize generic, rough estimations of camera parameters or to assume a simple orthographic camera model because the three-dimensional estimation system has the ability to estimate the necessary camera parameters of in-the-wild, single-view images from the perspective field representation.

Additionally, by simultaneously inferring the three-dimensional shape of the object, the pose of the object relative to the ground, and the camera parameters the three-dimensional estimation system improves accuracy relative to conventional systems. Specifically, the three-dimensional estimation system is able to compensate for unknown shifts, which cause distortion during three-dimensional reconstruction that arise from applying generic, rough estimations of camera parameters. For example, the three-dimensional estimation system accurately estimates the necessary camera parameters of in-the-wild, single-view images from the perspective field representation. Furthermore, the three-dimensional estimation system is able to preserve object-ground relation for objects and backgrounds in single-view, in-the-wild digital images by generating a ground-aware pixel height map as mentioned previously. Thus, the three-dimensional estimation system generates three-dimensional models accurately placed on the ground, in contrast, to the floating or tilted models resulting from conventionally generated models.

Additional detail regarding the three-dimensional estimation system will now be provided with reference to the figures. For example, FIG. 1 illustrates a schematic diagram of an exemplary system 100 in which a three-dimensional estimation system 106 operates. As illustrated in FIG. 1, the system 100 includes a server(s) 102, a network 108, and client devices 110a-110n.

Although the system 100 of FIG. 1 is depicted as having a particular number of components, the system 100 is capable of having any number of additional or alternative components (e.g., any number of servers, client devices, or other components in communication with the three-dimensional estimation system 106 via the network 108). Similarly, although FIG. 1 illustrates a particular arrangement of the server(s) 102, the network 108, and the client devices 110*a*-110*n*, various additional arrangements are possible.

The server(s) 102, the network 108, and the client devices 110*a*-110*n* are communicatively coupled with each other either directly or indirectly (e.g., through the network 108 discussed in greater detail below in relation to FIG. 6). Moreover, the server(s) 102 and the client devices 110*a*-110*n* include one or more of a variety of computing devices (including one or more computing devices as discussed in greater detail with relation to FIG. 6).

As mentioned above, the system 100 includes the server(s) 102. In one or more embodiments, the server(s) 102 generates, stores, receives, and/or transmits data, including digital images and modified digital images (e.g., digital images modified to include a point cloud or other three-dimensional representation). In one or more embodiments, the server(s) 102 comprises a data server. In some implementations, the server(s) 102 comprises a communication server or a web-hosting server.

In one or more embodiments, the image editing system 104 provides functionality by which a client device (e.g., one of the client devices 110*a*-110*n*) generates, edits, manages, and/or stores digital images. For example, in some instances, a client device sends a digital image to the image editing system 104 hosted on the server(s) 102 via the network 108. The image editing system 104 then provides options that the client device may use to edit the digital image, store the digital image, or generate a ground-aware depth map or point cloud representation.

In one or more embodiments, the client devices 110*a*-110*n* include computing devices that display and/or modify digital images. For example, the client devices 110*a*-110*n* include one or more of smartphones, tablets, desktop computers, laptop computers, head-mounted-display devices, and/or other electronic devices. In some instances, the client devices 110*a*-110*n* include one or more applications (e.g., the client application 112) that display and/or modify digital images. For example, in one or more embodiments, the client application 112 includes a software application installed on the client devices 110*a*-110*n*. Additionally, or alternatively, the client application 112 includes a web browser or other application that accesses a software application hosted on the server(s) 102 (and supported by the image editing system 104).

To provide an example implementation, in some embodiments, the three-dimensional estimation system 106 on the server(s) 102 supports the three-dimensional estimation system 106 on the client device 110*n*. For instance, in some cases, the three-dimensional estimation system 106 on the server(s) 102 generates or learns parameters for the dense representation neural network 114 and the perspective field guided pixel height reprojection model 116. The three-dimensional estimation system 106 then, via the server(s) 102, provides the dense representation neural network 114 and the perspective field guided pixel height reprojection model 116 to the client device 110*n*. In other words, the client device 110*n* obtains (e.g., downloads) the dense representation neural network 114 and the perspective field guided pixel height reprojection model 116 (e.g., with any learned parameters) from the server(s) 102. Once downloaded, the three-dimensional estimation system 106 on the client device 110*n* utilizes the dense representation neural network 114 and the perspective field guided pixel height reprojection model 116 to generate a pixel height map and a perspective field representation of an object portrayed in a digital image and from the pixel height map and perspective field representation. The three-dimensional estimation system 106 on the client device 110*n* also generates a three-dimensional point cloud and/or a ground-aware depth map of an object portrayed in a digital image independent of the server(s) 102.

In alternative implementations, the three-dimensional estimation system 106 includes a web hosting application that allows the client device 110*n* to interact with content and services hosted on the server(s) 102. To illustrate, in one or more implementations, the client device 110*n* accesses a software application supported by the server(s) 102. In response, the three-dimensional estimation system 106 on the server(s) 102 utilizes the dense representation neural network 114 and the perspective field guided pixel height reprojection model 116 to generate a pixel height map and a perspective field representation of an object portrayed in a digital image and from the pixel height map and perspective field representation. The server(s) 102 generates a three-dimensional point cloud and/or a ground-aware depth map of an object portrayed in a digital image. The server(s) 102 then provides the ground-aware depth map and/or point cloud to the client device 110*n* for display.

Indeed, the three-dimensional estimation system 106 is able to be implemented in whole, or in part, by the individual elements of the system 100. Indeed, although FIG. 1 illustrates the three-dimensional estimation system 106 implemented with regard to the server(s) 102, different components of the three-dimensional estimation system 106 are able to be implemented by a variety of devices within the system 100. For example, one or more (or all) components of the three-dimensional estimation system 106 are implemented by a different computing device (e.g., one of the client devices 110*a*-110*n*) or a separate server from the server(s) 102 hosting the image editing system 104. Indeed, as shown in FIG. 1, the client devices 110*a*-110*n* include the three-dimensional estimation system 106. Example components of the three-dimensional estimation system 106 will be described below with regard to FIG. 6.

Figure 2:
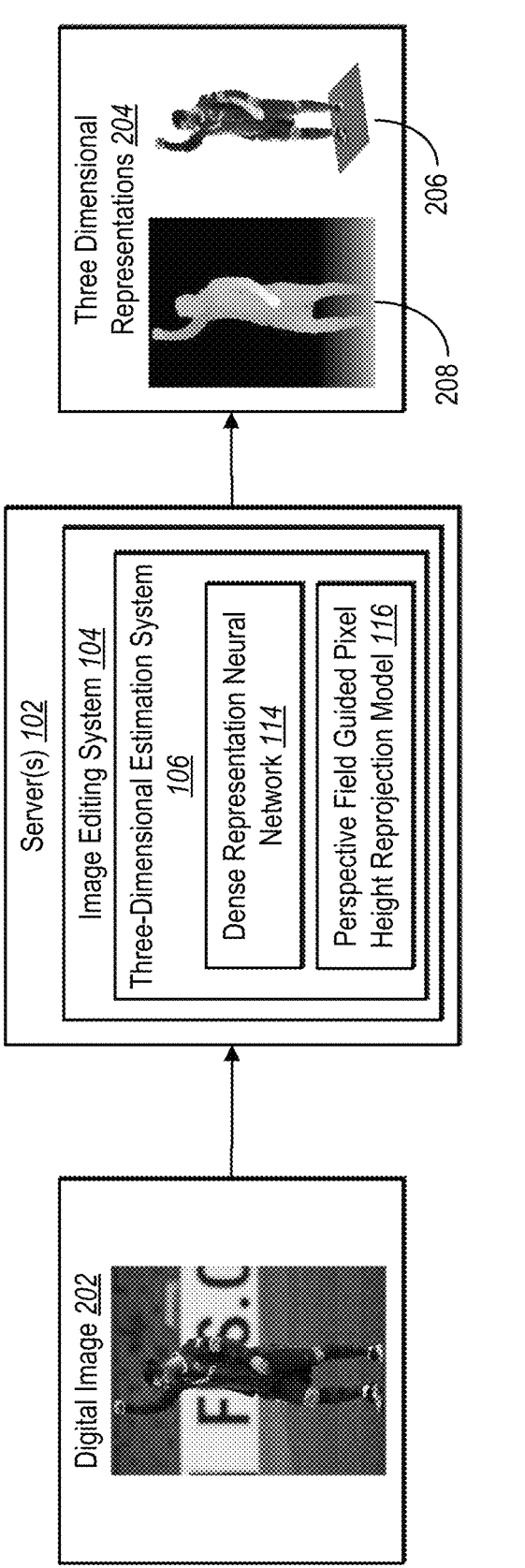
FIG. 2 illustrates an overview diagram of the three-dimensional estimation system generating three-dimensional representations for a digital object portrayed in a digital image in accordance with one or more embodiments.

FIG. 2 illustrates an overview diagram of the three-dimensional estimation system 106 generating three-dimensional representations 204 for a digital object portrayed in a digital image 202 in accordance with one or more embodiments. In some embodiments, the three-dimensional estimation system 106 receive a digital image 202 for generating three-dimensional representations 204 from the digital image 202. The three-dimensional representations 204 generated by the three-dimensional estimation system 106 includes, for example, a point cloud 206 and/or a ground-aware depth map 208 as shown in FIG. 2. As shown in FIG. 2, a point cloud A point cloud is a collection of points in the 3D space representing the structure of an object (or set of objects). A single point cloud can comprise thousands or millions of points.

The digital image 202 in one or more embodiments is an in-the-wild image. In-the-wild images comprise images which are taken without a predetermined pose in which camera parameters are known. Indeed, in these or other embodiments, in-the-wild images have varied geometry and texture of objects in real-world scenarios, intertwined with unknown object-ground relationships, camera pose, and focal length. Furthermore, the digital image 202, in one or more embodiments, is a single-view, two-dimensional image in which one or more objects are portrayed.

In some embodiments, the three-dimensional estimation system 106 utilizes a variety of neural networks for generating three-dimensional representations 204 for a digital object portrayed in a digital image 202. For example, the three-dimensional estimation system 106 utilizes a dense representation neural network 114, a perspective field guided pixel height reprojection model 116, a height prediction neural network, and/or a dense field machine learning model as will be discussed in further detail below with regard to FIG. 3.

In one or more embodiments, a neural network includes a type of machine learning model, which is tunable (e.g., trainable) based on inputs to approximate unknown functions used for generating the corresponding outputs. In particular, in some embodiments, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, a multi-layer perceptron, a transformer-based network, a large language model, etc. In some embodiments, a neural network includes a combination of neural networks or neural network components.

As mentioned above, the three-dimensional estimation system 106 generates three-dimensional representations 204 of a digital object portrayed in a digital image 202. In one or more embodiments, the three-dimensional estimation system 106 generates one, or both, of a point cloud 206 and a ground-aware depth map 208 of an object portrayed in a digital image 202 as will be discussed in further detail below with regard to FIG. 3.

Figure 3:
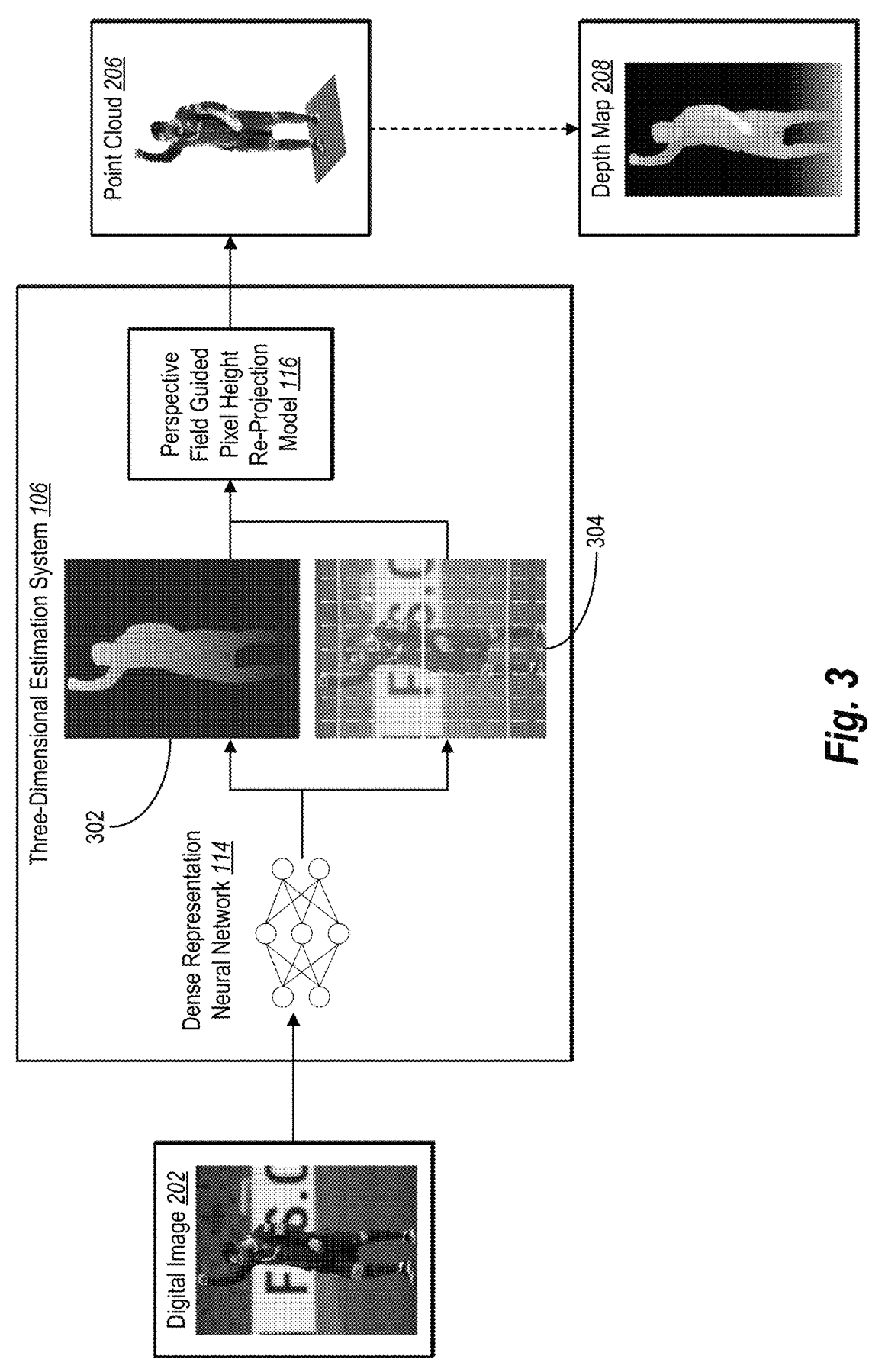
FIG. 3 illustrates an example diagram for jointly generating a pixel height map and a perspective field representation of an object portrayed in a digital image utilizing the dense representation neural network in accordance with one or more embodiments.

In one or more implementations, the three-dimensional estimation system 106 utilizes one or more machine learning models to generate the depth map 208 and the point cloud 206. For example, FIG. 3 illustrates an example diagram for jointly generating a pixel height map 302 and a perspective field representation 304 of an object portrayed in a digital image 202 utilizing a dense representation neural network 114. Furthermore, the three-dimensional estimation system 106 utilizes the perspective field guided pixel height reprojection model 116 to generate the point cloud 206 from the estimated pixel height map 302 and the perspective field representation 304. The three-dimensional estimation system 106 optionally further generates a ground-aware depth map 208 from the point-cloud 206.

Figure 4:
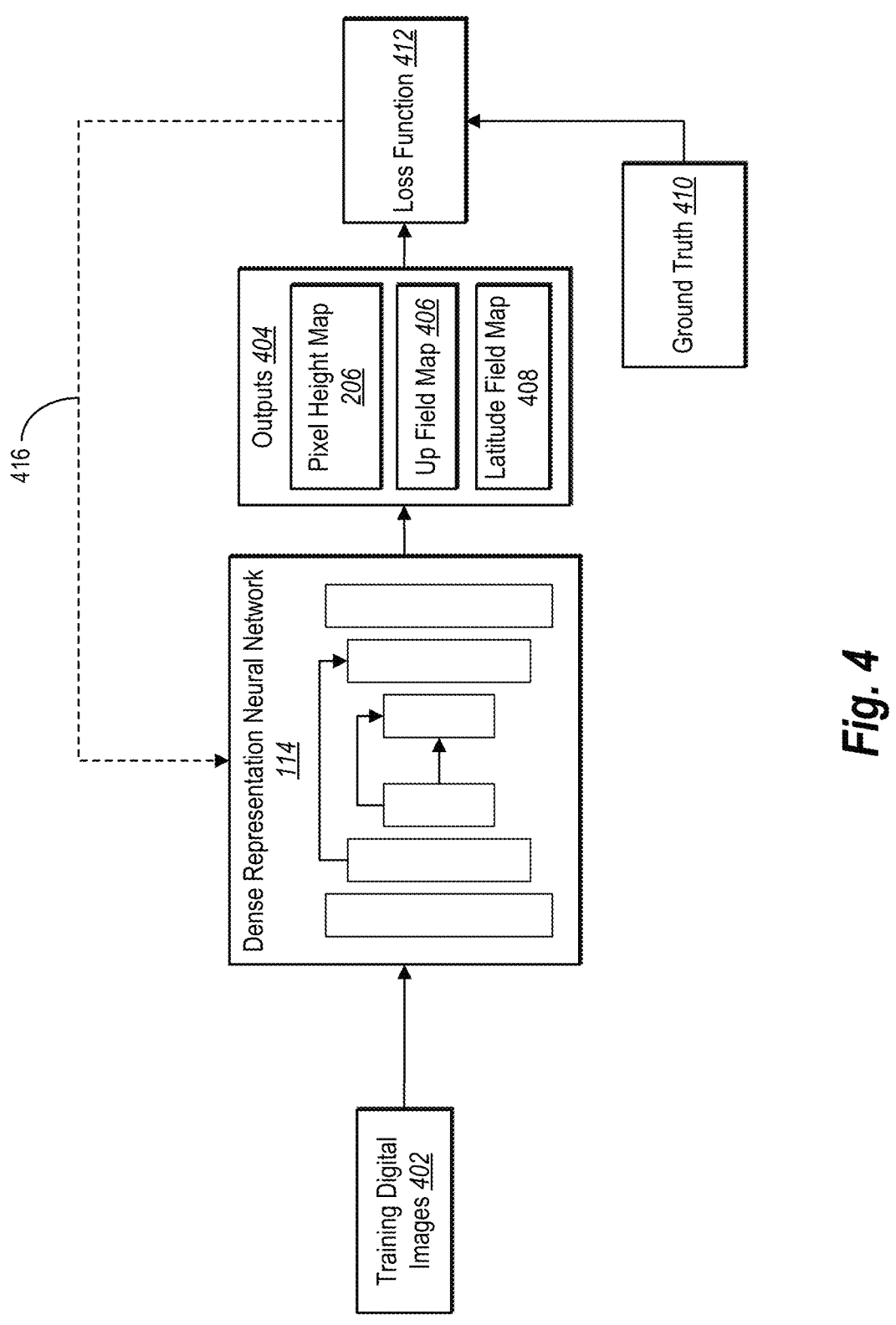
FIG. 4 illustrates a diagram for training a dense representation neural network in accordance with one or more embodiments.

As shown by FIG. 3, in one or more embodiments, the three-dimensional estimation system 106 utilizes a dense representation neural network 114 to jointly generate the pixel height map 302 and the perspective field representation 304. In or more implementations, the dense representation neural network 114 comprises an encoder-decoder architecture as shown in FIG. 4. For example, the dense representation neural network 114 comprises a neural network encoder and neural network decoder. In one or more implementations, the neural network encoder exacts a feature map from the digital image 202. In one or more implementations, the neural network encoder of the dense representation neural network 114 comprises a transformer-based encoder. Specifically, in one or more implementations, the neural network encoder of the dense representation neural network 114 comprises a hierarchical transformer. For example, in one or more implementations, the neural network encoder of the dense representation neural network 114 comprises a transformer with a pyramid architecture. In one or more implementations the neural network decoder comprises two decoders—one that decodes the pixel height map 302 and another that decodes the perspective field representation 304. For example, in one or more implementations, the neural network decoder of the dense representation neural network 114 comprises one or more multi-layer perceptrons (MLPs).

The dense representation neural network 114 generates a pixel height map 302 that provides a dense representation of pixel heights, namely pixel distances between points on an object represented in a digital image and the points' ground projections. In these or other embodiments, the ground projection of a pixel is its vertical projection relative to the ground in the digital image. Moreover, by generating a pixel height map, the three-dimensional estimation system 106 estimates the object-ground relationship of an object in a digital image. In one or more implementations, the dense representation neural network 114 generates a pixel height map 302 that is disentangled from the camera model. This allows the dense representation neural network 114 to directly infer the pixel height map 302 from the content of the digital image 202 without additional camera information. Furthermore, in one or more implementations, the dense representation neural network 114 jointly predicts the camera intrinsics and pose relative to the ground. In this end, the dense representation neural network 114 utilizes the field-of-view (FoV) to lift pixel distances into metric distance utilizes the camera viewpoint to help align the object into a canonical pose relative to the ground.

In addition to generating a pixel height map 302, the three-dimensional estimation system 106 generates the perspective field representation 304 utilizing a dense representation neural network 114. In some implementations, to generate the perspective field representation 304, the three-dimensional estimation system 106 generates a latitude field and an up-vector field. For example, a latitude field is represented by lateral contour lines on the perspective field representation 304 of FIG. 3 and an up-vector field is represented by green arrows on the perspective field representation 304 of FIG. 3. Specifically, assuming a camera-centered spherical coordinate system where the zenith direction is opposite to gravity, the camera model $\mathcal{K}$ projects a 3D position $X \in \mathbb{R}^3$ in the spherical coordinate into the image frame $x \in \mathbb{R}^2$. For each pixel location x, the up-vector is defined as the projection of the tangential direction of X along the meridian towards the north pole, the latitude is defined as the angle between the vector pointing from the camera to X and the ground plane. Thus, the latitude field and the up-vector field encodes the elevation angle and the roll angle of the points on the object, respectively. Both perspective fields and pixel height map are in-variant or equivariant to image editing operations like cropping, rotation, and translation. As a result, they are highly suitable for neural network models designed for dense prediction tasks.

Thus, in one or more implementations, the dense representation neural network 114 generates a perspective field representation 304 comprising both the latitude field and the up-vector field. Furthermore, the three-dimensional estimation system 106 estimates camera parameters for accurate three-dimensional reconstruction from a two-dimensional digital image 202 from the perspective field representation 304. For example, the three-dimensional estimation system 106 estimates camera parameters such as an elevation angle, a roll angle, a pitch angle, a field-of-view, an extrinsic rotation matrix, a camera focal length, and an intrinsic matrix. In particular, the three-dimensional estimation system 106 estimates the elevation angle of points, or pixels, on the object represented in the digital image 202 from the latitude field and the roll angle of the points, or pixels, on the object represented in the digital image 202 from the up-vector field.

As mentioned above, in some embodiments, the three-dimensional estimation system 106 utilizes the dense representation neural network 114 for joint estimation (e.g. joint generation) of the pixel height map 302 and the perspective field representation 304 from the digital image 202. Indeed, the per-pixel structure and translation-invariant nature of the pixel height map 302 and perspective field representation 304 make them highly suitable for neural network prediction. More specifically, to generate the pixel height map 302, the three-dimensional estimation system 106 formulates the dense field estimation task as a regression problem. The three-dimensional estimation system 106 normalizes the pixel height map 302 with the height of the digital image 202. Further, for the latitude field, the three-dimensional estimation system 106 normalize the original [−π/2, π/2] range into [0,1]. Additionally, for the up-vector field, the three-dimensional estimation system 106 has each angle θ range from 0 to 2π, so direct normalization and regression poses ambiguity to the model as 0 and 2π represents the same angle. Thus, the three-dimensional estimation system 106 represents each angle θ with (sin θ, cos θ) tuple. Furthermore, the dense representation neural network 114 regresses to a two-channel vector map wherein all the regression tasks are trained with ℓ2 loss.

As shown by FIG. 3, the three-dimensional estimation system 106 utilizes the perspective field guided pixel height reprojection model 116 to generate the point cloud 206 from the estimated pixel height map 302 and the perspective field representation 304 by estimating the object-ground relationship from the pixel height map 302 and the camera parameters from the perspective field representation 304. Additionally, the three-dimensional estimation system 106 optionally generates the ground-aware depth map 208 from the point cloud 206.

As mentioned above, in some implementations, the three-dimensional estimation system 106 utilizes the perspective field guided pixel height reprojection model 116 to estimate the object-ground relationship from the pixel height map 302 and camera parameters from the perspective field representation 304 to project one, or both, of the point cloud 206 and the ground-aware depth map 208. In particular, in some embodiments, the three-dimensional estimation system 106 derives the ground-aware depth map 208 from the point cloud 206. Moreover, the perspective field guided pixel height reprojection model 116 derives the point cloud 206 from the estimated pixel height map 302 and the perspective field representation 304.

To derive (e.g., generate) the point cloud 206 from the estimated pixel height map 302 and perspective field representation 304, in one or more embodiments, the perspective field guided pixel height reprojection model 116 estimates an object-ground relationship from the pixel height map 302 and the camera parameters from the perspective field representation 304. For example, the perspective field guided pixel height reprojection model 116 discretizes the continuous parameter range and uses a grid search optimization strategy to estimate camera field of view α and extrinsic rotation matrix R as roll and pitch angles. Further, the perspective field guided pixel height reprojection model 116 generates a camera focal length f utilizing the following:

$$f = \frac{H}{2 \tan \alpha/2},$$

where H is the height of the digital image 202. Moreover, the perspective field guided pixel height reprojection model 116 also estimate the intrinsic matrix K as:

$$K = \begin{bmatrix} f & 0 & c_x \\ 0 & f & c_y \\ 0 & 0 & 1 \end{bmatrix}$$

where $(c_x, c_y)$ is the principle point of the digital image and, in some embodiments, is estimated to be the center of the image. Additionally, in some implementations, given one pixel $p=(x,y) \in \mathbb{R}^2$, the three-dimensional estimation system 106 determines the pixel's vertical projection point $\tilde{p}=(\tilde{x}, \tilde{y}) \in \mathbb{R}^2$ on the ground in the image frame from the estimated pixel height map 302. Further, the perspective field guided pixel height reprojection model 116 projects a three-dimensional point $P_i$ in a world coordinate into an image pixel $p_i = RKP_i$ using intrinsic and extrinsic matrices. For instance, in some implementations, the perspective field guided pixel height reprojection model 116 utilizes the intrinsic matrix and the extrinsic rotation matrix to back-project the two corresponding pixels into three-dimensional world coordinates, with an unknown depth scale as follows:

$$\text{Object pixel: } K^{-1}R^{-1}(d \cdot p) = P = (X, Y, Z)$$

$$\text{Ground pixel: } K^{-1}R^{-1}(\tilde{d} \cdot \tilde{p}) = \tilde{P} = (\tilde{X}, \tilde{Y}, \tilde{Z})$$

where d and P represents the unknown depth value, and the corresponding three-dimensional world coordinate of the object pixel p. Where and $\tilde{P}$ represent those of the projected ground pixel $\tilde{p}$. Since the parameters of the left-hand side of the above equations are known, except for d and , the perspective field guided pixel height reprojection model 116 eliminate the unknown depth value $d_i$ for each pixel $p_i$ to determine the right-hand sides of the above equations. The constraints come from two observations. First, according to the definition of pixel height, the corresponding points P and P share two same coordinates, i.e., $(X,Y)=(\tilde{X}, \tilde{Y})$. Furthermore, all points on the ground share the same Z coordinate, which equals to the distance between camera and the ground plane. Normalizing the right-hand side of ground pixel equation above such that $\tilde{Z}=1$, the perspective field guided pixel height reprojection model 116 scales the object pixel equation above such that the first constraint is held and takes the final right-hand side of the object pixel equation above as the generated 3D point. In this manner the perspective field guided pixel height reprojection model 116 derives point clouds from the estimated pixel height map 302 and the perspective field 304. Furthermore, the perspective field guided pixel height reprojection model 116 generates the scale-invariant and ground aware depth map 208 from the point cloud 206.

While FIG. 3 illustrates the three-dimensional estimation system 104 jointly generating the pixel height map 302 and the perspective field representation 304 utilizing a single neural network, in some implementations the three-dimensional estimation system 106 utilizes separate neural networks to separately generate a pixel height map 302 and a perspective field representation 304 from the digital image 202. For instance, in one or more implementations, the three-dimensional estimation system 106 utilizes a height prediction neural network to generate a pixel height map 302 as described in U.S. application Ser. No. 18/162,317, filed Jan. 31, 2023, entitled GENERATING HARD OBJECT SHADOWS FOR GENERAL SHADOW RECEIVERS WITHIN DIGITAL IMAGES UTILIZING HEIGHT MAPS, the contents of which are herein incorporated by reference in their entirety. Additionally, in one or more embodiments, the three-dimensional estimation system 106 utilizes a dense field machine learning model to generate a perspective field representation 304 as described in U.S. application Ser. No. 17/656,796, filed Mar. 28, 2022, entitled MACHINE LEARNING BASED IMAGE CALIBRATION USING DENSE FIELDS, the contents of which are herein incorporated by reference in their entirety.

In one or more embodiments, the three-dimensional estimation system 106 generates (e.g., trains) a dense representation neural network 114 to generate pixel height maps and perspective field representations for digital objects portrayed in digital images. FIG. 4 illustrates a diagram for training a dense representation neural network 114 to generate a pixel height map and a perspective field representation in accordance with one or more embodiments.

Indeed, as shown in FIG. 4, the three-dimensional estimation system 106 utilizes training digital images training digital images 402 for training a dense representation neural network 114. In some implementations, the dense representation neural network 114 generates outputs 404 including the point cloud 206, an up-field map 406, and a latitude field map 408. For example, the three-dimensional estimation system 106 utilizes the dense representation neural network 114 to analyze a training digital image from the training digital images 402 and generates the point cloud 206, the up-field map 406, and the latitude field map 408 as described above. Further, the three-dimensional estimation system 106 compares the point cloud 206, up-field map 406, and the latitude field map 408 to a ground truth ground truth 410 via a loss function loss function 412 to determine a loss (i.e., an error) of the dense representation neural network 114.

As shown in FIG. 4, the three-dimensional estimation system 106 back propagates the determined loss to the dense representation neural network 114 (as shown by the dashed line 416) to update the parameters of the dense representation neural network 114. In particular, the three-dimensional estimation system 106 updates the parameters to minimize the error of the dense representation neural network 114 in generating pixel height maps and perspective field representations for digital objects portrayed in digital images.

Though FIG. 4 illustrates generating the dense representation neural network 114 using one refinement iteration, it should be noted that, in some embodiments, the three-dimensional estimation system 106 generates the dense representation neural network 114 using multiple refinement iterations. In one or more embodiments, with each iteration of refinement, the three-dimensional estimation system 106 gradually improves the accuracy with which the dense representation neural network 114 generates pixel height maps and perspective field representations for digital objects.

In one or more implementations, the training digital images 402 comprise a diverse dataset of object and human centric images with different camera poses. In one or more implementations, the three-dimensional estimation system

106 trains with the AdamW optimizer and utilizes horizontal flipping, random cropping, and color jittering augmentation for robust training.

Figure 5:
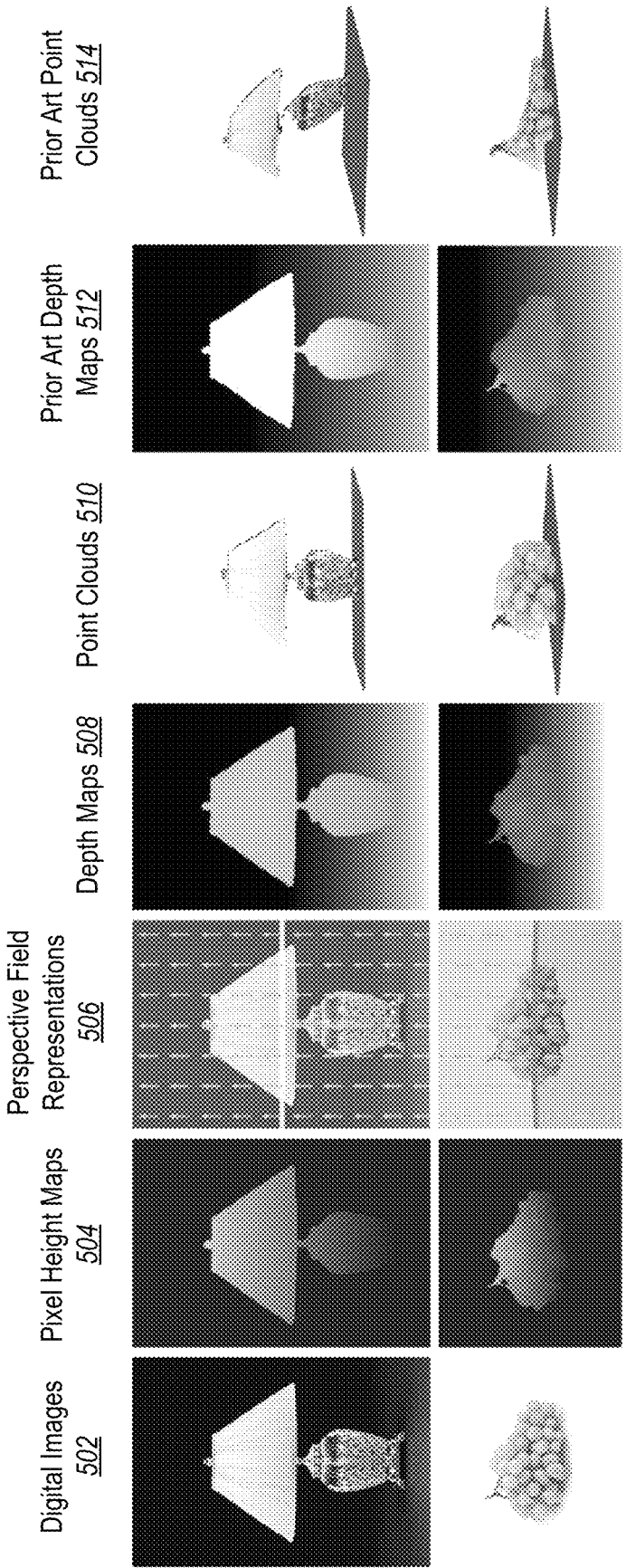
FIG. 5 illustrates example depth maps and point clouds generated by the three-dimensional estimation system compared with example prior art depth maps and prior art point clouds in accordance with one or more embodiments.

As mentioned previously, the three-dimensional estimation system 106 generate point clouds and depth maps of an object portrayed in a single, in-the-wild digital image. For example, FIG. 5 illustrates example depth maps 508 and point clouds 510 generated by the three-dimensional estimation system 106 compared with example prior art depth maps 512 and prior art point clouds 514 in accordance with one or more embodiments. In one or more embodiments, the three-dimensional estimation system 106 receive inputs such as single-view, in-the-wild digital images, for instance digital images 502, as illustrated in FIG. 5. In some implementations, the three-dimensional estimation system 106 generates the depth maps 508 and the point clouds 510 from the digital images 502 as mentioned above. Further, in one or more implementations, the three-dimensional estimation system 106 generates pixel height maps 504 and perspective field representations 506 as an intermediate step to generating the depth maps 508 and the point clouds 510.

As illustrated in FIG. 5, the depth maps 508 and the point clouds 510 generated by the three-dimensional estimation system 106 have greater fidelity to the actual three-dimensional structure of objects in the digital images 502 than the prior art depth maps 512 and the prior art point clouds 514. For example, as illustrated in FIG. 5, the point clouds 510 generated from the digital images 502 by the three-dimensional estimation system 106 clearly capture the dimensions of the objects depicted in the digital images 502 better than the prior art point clouds 514. Similarly, the depth maps 508 generated from the digital images 502 by the three-dimensional estimation system 106 capture the dimensions of the objects depicted in the digital images 502 better than the prior art depth maps 512.

In some embodiments, the capability of the three-dimensional estimation system 106 to generate high fidelity point clouds and depth maps results, at least in part, from the intermediate step of generating pixel height maps and perspective field representations. For example, as mentioned previously, in some implementations, pixel height maps and perspective field representations are utilized to generate the point clouds and depth maps of objects represented in single-view, in-the-wild digital images. Indeed, the pixel height maps 504 and the perspective field representations 506 were utilized to generate the depth maps 508 and the point clouds 510 whereas the prior art depth maps 512 and the prior art point clouds 514 were not generated from pixel height maps or perspective field representations.

Furthermore, Table 1 below show that the joint learning of pixel height and perspective field lead to the best reconstruction performance compared with depth estimation and off-the-shelf camera parameter estimator. More specifically, without modifying the model architecture, experimenters changed the objective of the model from pixel height estimation to depth estimation following the loss used in LeReS by Yin et al., Learning to Recover 3d Scene Shape from a Single Image, in CVPR, 2021. The experimenters trained with the same dataset and scheduler, the pixel height representation is able to achieve better point cloud reconstruction that the depth-based learning. The experimenters not that this is because the representation focuses more on object-ground geometry rather than object-camera geometry, which is more natural and easier to infer from object-centric images. This observation further validates that the superior generalizability of three-dimensional estimation system 106 comes from the better representation design and joint training strategy, rather than the dataset.

TABLE 1

| Object Geometry | Camera Parameters | LSIV↓ | diff |
|---|---|---|---|
| depth | OFS estimator | 1.25 | 0 |
| depth | perspective field | 1.01 | −0.24 |
| pixel height | OFS estimator | 0.98 | −0.27 |
| pixel height | perspective field | 0.81 | −0.44 |

Figure 6:
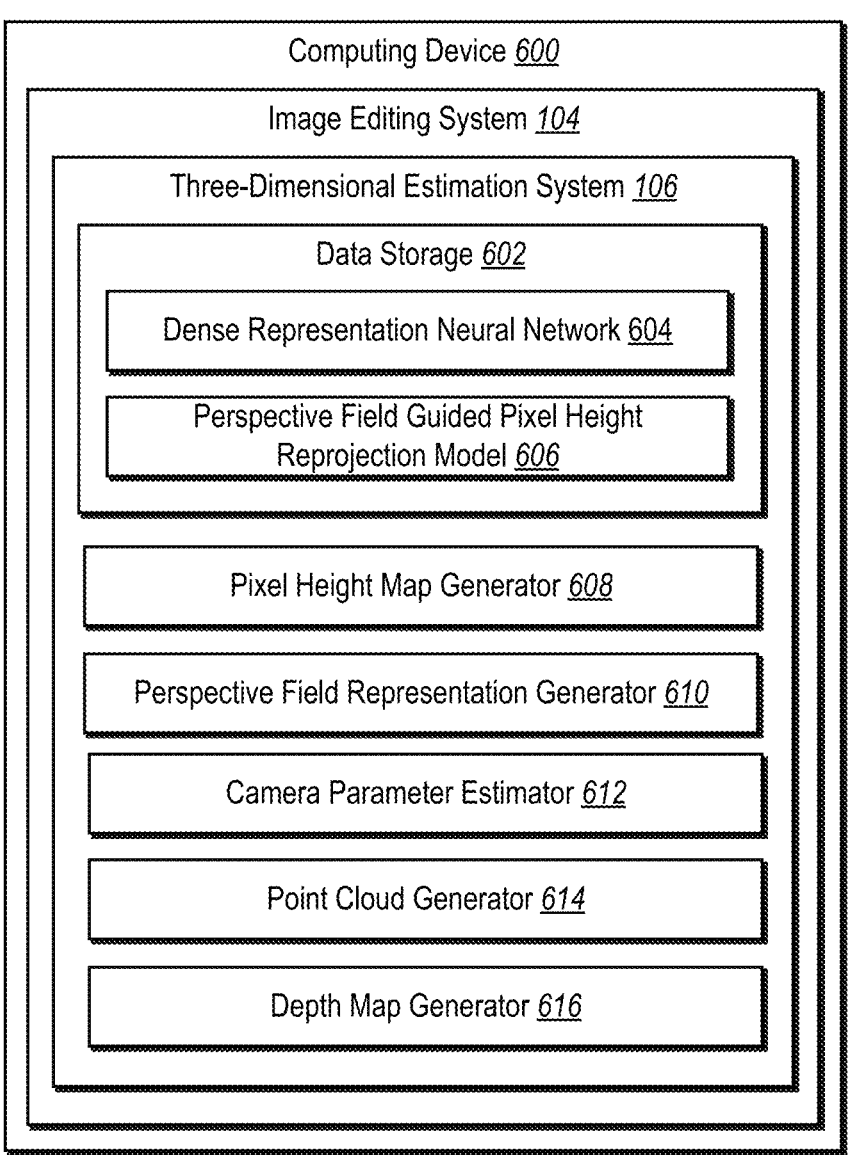
FIG. 6 illustrates an example schematic diagram of a three-dimensional estimation system in accordance with one or more embodiments.

Turning to FIG. 6, additional detail will now be provided regarding various components and capabilities of the three-dimensional estimation system 106. In particular, FIG. 6 illustrates the three-dimensional estimation system 106 implemented by the computing device 600 (e.g., the server(s) 102 and/or one of the client devices 110*a*-110*n* discussed above with reference to FIG. 1). Additionally, the three-dimensional estimation system 106 is also part of the image editing system 104. As shown, in one or more embodiments, the three-dimensional estimation system 106 includes, but is not limited to data storage 602 (which includes, but is not limited to, a dense representation neural network 604 and a perspective field guided pixel height reprojection model 606), a pixel height map generator 608, a perspective field representation generator 610, a camera parameter estimator 612, a point cloud generator 614, and a depth map generator 616.

As just mentioned, as shown in FIG. 6, the three-dimensional estimation system 106 includes data storage 602. In particular, data storage 602 includes the dense representation neural network 604 and the perspective field guided pixel height reprojection model 606 utilized in generating point clouds and depth maps for digital objects portrayed in digital images.

Additionally, as shown in FIG. 6, the three-dimensional estimation system 106 includes the pixel height map generator 608. In one or more embodiments, the pixel height map generator generates pixel height maps and perspective field representations for digital objects portrayed in digital images. For instance, in some embodiments, the pixel height map generator 608 estimates (e.g., generates) an object-ground relationship and a ground projection of an object portrayed in a digital image to generate a pixel height map.

As illustrated in FIG. 6, the three-dimensional estimation system 106 also includes the perspective field representation generator 610. In one or more implementations, the perspective field representation generator 610 generates perspective field representations for digital objects portrayed in digital images. For instance, in some implementations, the perspective field representation generator 610 estimates (e.g., generates) a perspective field representation comprised of an up-vector field and a latitude field of a digital object portrayed in a digital image. Indeed, in one or more implementations, the three-dimensional estimation system 106 generates the pixel height maps and perspective field representations jointly.

As shown in FIG. 6, the three-dimensional estimation system 106 further includes the camera parameter estimator 612. In one or more embodiments, the camera parameter estimator 612 estimates camera parameters from the perspective field representations generated by the perspective field representation generator 610.

As illustrated in FIG. 6, the three-dimensional estimation system 106 further includes the point cloud generator 614. In one or more embodiments, the point cloud generator 614 generates a three-dimensional point cloud of a digital object portrayed in a digital image from the estimated camera parameters and the pixel height map. For example, the point cloud generator 614 estimates the point cloud from an estimated object-ground relationship and estimated camera parameters, which are generated from a pixel height map, a latitude field, and an up-vector field. As shown in FIG. 6 the three-dimensional estimation system 106 further include the depth map generator 616. The depth map generator 616 generates depth maps from the point clouds generated by the point cloud generator 614.

Each of the components 602-616 of the three-dimensional estimation system 106 optionally include software, hardware, or both. For example, the components 602-616 include one or more instructions stored on a computer-readable storage medium and executable by processors of one or more computing devices, such as a client device or server device. When executed by the one or more processors, the computer-executable instructions of the three-dimensional estimation system 106 cause the computing device(s) to perform the methods described herein. Alternatively, the components 602-616 include hardware, such as a special-purpose processing device to perform a certain function or group of functions. Alternatively, the components 602-616 of the three-dimensional estimation system 106 include a combination of computer-executable instructions and hardware.

Furthermore, the components 602-616 of the three-dimensional estimation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 602-616 of the three-dimensional estimation system 106 may be implemented as a stand-alone application, such as a desktop or mobile application. Furthermore, the components 602-616 of the three-dimensional estimation system 106 may be implemented as one or more web-based applications hosted on a remote server. Alternatively, or additionally, the components 602-616 of the three-dimensional estimation system 106 may be implemented in a suite of mobile device applications or "apps." For example, in one or more embodiments, the three-dimensional estimation system 106 comprises or operates in connection with digital software applications such as ADOBE® AFTER EFFECTS®, ADOBE® ILLUSTRATOR®, or ADOBE® PHOTOSHOP®. The foregoing are either registered trademarks or trademarks of Adobe Inc. in the United States and/or other countries.

FIGS. 1-6, the corresponding text, and the examples provide a number of different systems, methods, and non-transitory computer readable media for estimating the three-dimensional geometry of an object in a digital image by modeling the ground, object, and camera simultaneously and generating three-dimensional representations, including point clouds and depth maps, of the object. In addition to the foregoing, embodiments can also be described in terms of flowcharts comprising acts for accomplishing a particular result. For example, FIG. 7 illustrates a flowchart of an example sequence of acts in accordance with one or more embodiments.

While FIG. 7 illustrates acts according to some embodiments, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7. Additionally, the acts described herein may be repeated or performed in parallel with one another or in parallel with different instances of the same or other similar acts.

FIG. 7 illustrates an example series of acts 700 for estimating the three-dimensional geometry of an object in a digital image by modeling the ground, object, and camera simultaneously and generating three-dimensional representations of the object. The series of acts 700 include an act 702 of receiving a two-dimensional digital image portraying an object; an act 704 of generating an estimate of an object-ground relationship of the object portrayed in the two-dimensional digital image and an estimate of camera parameters for the two-dimensional digital image; and an act 706 of generating one or more of a three-dimensional point cloud or a depth map of the object from the estimated object-ground relationship and the estimated camera parameters.

In one or more implementations, generating, utilizing the dense representation neural network, the estimate of the object-ground relationship of the object portrayed in the two-dimensional digital image comprises generating a pixel height map that indicates pixel distances between points on the object and a ground projection. Moreover, in some embodiments, generating, utilizing the dense representation neural network, the estimate of the camera parameters for the two-dimensional digital image comprises generating a perspective field representation comprising a latitude field and an up-vector field. In addition, in some implementations, generating, the pixel height map that indicates the pixel distances between the points on the object and the ground projection and generating the perspective field representation comprising the latitude field and the up-vector field comprises generating the pixel height map and the perspective field representation jointly.

Furthermore, in some embodiments, generating, utilizing the dense representation neural network, the estimate of the object-ground relationship of the object portrayed in the two-dimensional digital image and the estimate of the camera parameters for the two-dimensional digital image comprises generating an estimate of an elevation angle and a roll angle of a camera. In some implementations, generating, utilizing the perspective field guided pixel height reprojection model, one or more of the three-dimensional point cloud or the depth map of the object from the estimated object-ground relationship and the estimated camera parameters comprises generating the camera parameters from the pixel height map, the latitude field, and the up-vector field. Moreover, in some embodiments, generating, utilizing the perspective field guided pixel height reprojection model, one or more of the three-dimensional point cloud or the depth map of the object from the estimated object-ground relationship and the estimated camera parameters comprises generating the three-dimensional point cloud from the camera parameters. In addition, in some implementations, the acts 702-706 include generating the depth map from the three-dimensional point cloud.

Furthermore, in one or more implementations another series of acts includes receiving a two-dimensional digital image portraying an object; generating, utilizing a dense representation neural network, an estimate of an object-ground relationship of the object portrayed in the two-dimensional digital image and an estimate of camera parameters for the two-dimensional digital image; and generating, utilizing a perspective field guided pixel height reprojection model, one or more of a three-dimensional point cloud or a depth map of the object from the estimated object-ground relationship and the estimated camera parameters.

In one or more implementations, jointly generating, utilizing the dense representation neural network, the pixel height field and the perspective field representation comprises generating a pixel height map, an up-field map, and a latitude field map as out puts from the dense representation neural network. Moreover, in some embodiments, generating the pixel height map, the up-field map, and the latitude field map comprises utilizing a decoder head of the dense representation neural network to produce a regression value for the pixel height map, the up-field map, and the latitude field map.

In addition, in some implementations, generating the pixel height map comprises normalizing the pixel height field with a height of the object portrayed in the two-dimensional digital image. Furthermore, in some embodiments, generating the latitude field map comprises normalizing an original range of the latitude field. In some implementations, jointly generating, utilizing the dense representation neural network, the pixel height field and the perspective field representation comprises utilizing a transformer-based encoder.

Furthermore, in one or more implementations another series of acts includes receiving a two-dimensional digital image portraying an object; and jointly generating, utilizing a dense representation neural network: a pixel height field that indicates pixel distances between points on the object and a ground projection, and a perspective field representation comprising a latitude field and an up-vector field. In addition, in some implementations, generating, utilizing the one or more neural networks, the pixel height map and the perspective field representation comprises utilizing a dense representation neural network to jointly gene rate the pixel height map and the perspective field representation.

Furthermore, in some embodiments, generating, utilizing the one or more neural networks, the pixel height map comprises utilizing a height prediction neural network to generate the pixel height map. In one or more implementations, generating, utilizing the one or more neural networks, the perspective field representation comprises utilizing a dense field machine learning model to generate the perspective field representation. Moreover, in some embodiments, generating, utilizing the perspective field guided pixel height reprojection model, the three-dimensional point cloud comprises, generating camera parameters from the pixel height map and the perspective field representation; and projecting two-dimensional points from the object into three-dimensions. In addition, in some implementations, generating the camera parameters from the pixel height map and the perspective field representation comprises estimating a field-of-view, an extrinsic rotation matrix, a focal length, and an intrinsic matrix of a camera.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
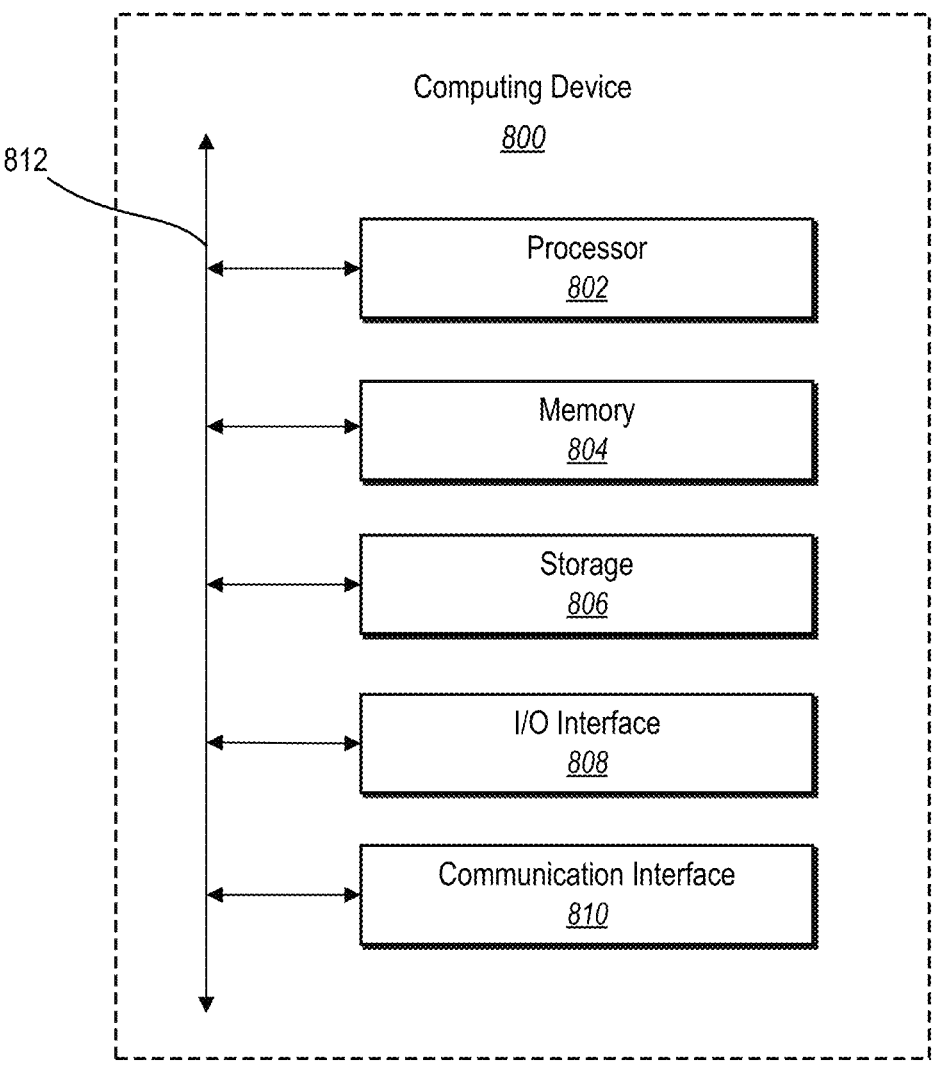
FIG. 8 illustrates a block diagram of an example computing device for implementing one or more embodiments of the present disclosure.

FIG. 8 illustrates a block diagram of an example computing device 800 that may be configured to perform one or more of the processes described above. One will appreciate that one or more computing devices, such as the computing device 800 may represent the computing devices described above (e.g., computing device 600, server(s) 102, and client devices 110a-n). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments.

Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:

receiving a single two-dimensional digital image portraying an object;

generating, from the single two-dimensional digital image and utilizing a dense representation neural network, an estimate of an object-ground relationship of the object portrayed in the single two-dimensional digital image and an estimate of camera parameters for the single two-dimensional digital image by:

generating, utilizing a first decoder of the dense representation neural network, a pixel height map that indicates a number of pixels from the object to a ground;

generating, utilizing a second decoder of the dense representation neural network and jointly with generating the pixel height map, a perspective field representation; and estimating the camera parameters for the single two-dimensional digital image from the perspective field representation; and generating, utilizing a perspective field guided pixel height reprojection model, one or more of a three-dimensional point cloud or a depth map of the object from the estimated object- ground relationship and the estimated camera parameters.

2. The method of claim 1, wherein generating the pixel height map comprises normalizing a pixel height field with a height of the object portrayed in the single two-dimensional digital image.

3. The method of claim 2, wherein generating the perspective field representation comprises generating a latitude field represented by lateral contour lines and an up-vector field represented by arrows on the perspective field representation.

4. The method of claim 3, wherein generating the pixel height map comprises inferring the object-ground relationship from the single two-dimensional digital image without direct camera information.

5. The method of claim 1, wherein generating, utilizing the dense representation neural network, the estimate of the object-ground relationship of the object portrayed in the single two-dimensional digital image and the estimate of the camera parameters for the single two-dimensional digital image comprises generating an estimate of an elevation angle and a roll angle of a camera.

6. The method of claim 3, wherein generating, utilizing the perspective field guided pixel height reprojection model, one or more of the three-dimensional point cloud or the depth map of the object from the estimated object-ground relationship and the estimated camera parameters comprises generating the camera parameters from the pixel height map, the latitude field, and the up-vector field.

7. The method of claim 6, wherein generating, utilizing the perspective field guided pixel height reprojection model, one or more of the three-dimensional point cloud or the depth map of the object from the estimated object-ground relationship and the estimated camera parameters comprises generating the three-dimensional point cloud from the camera parameters.

8. The method of claim 7, further comprising generating the depth map from the three-dimensional point cloud.

9. A system comprising:

one or more memory devices; and one or more processors coupled to the one or more memory devices that cause the system to perform operations comprising:

receiving a single two-dimensional digital image portraying an object;

jointly generating, from the single two-dimensional digital image, utilizing a dense representation neural network:

a pixel height field that indicates pixel distances between points on the object and a ground projection, and a perspective field representation comprising a latitude field and an up-vector field;

estimating camera parameters for the single two-dimensional digital image from the perspective field representation; and generating, utilizing a perspective field guided pixel height reprojection model, one or more of a three-dimensional point cloud or a depth map of the object based on the pixel height field and the estimated camera parameters.

10. The system of claim 9, wherein jointly generating, utilizing the dense representation neural network, the pixel height field and the perspective field representation comprises generating a pixel height map, an up-field map, and a latitude field map as outputs from the dense representation neural network.

11. The system of claim 10, wherein generating the pixel height map, the up-field map, and the latitude field map comprises utilizing a decoder head of the dense representation neural network to produce a regression value for the pixel height map, the up-field map, and the latitude field map.

12. The system of claim 10, wherein generating the pixel height map comprises normalizing the pixel height field with a height of the object portrayed in the single two-dimensional digital image.

13. The system of claim 10, wherein generating the latitude field map comprises normalizing an original range of the latitude field.

14. The system of claim 10, wherein jointly generating, utilizing the dense representation neural network, the pixel height field and the perspective field representation comprises utilizing a transformer-based encoder.

15. A non-transitory computer-readable medium storing instructions thereon that, when executed by at least one processor, cause the at least one processor to perform operations comprising:

generating, utilizing one or more neural networks:

a pixel height map that indicates pixel distances between points on an object portrayed in a single digital image and a ground projection for the single digital image; and a perspective field representation comprising a latitude field and an up-vector field for the single digital image;

estimating camera parameters for the single digital image from the perspective field representation; and generating, utilizing a perspective field guided pixel height reprojection model, a three-dimensional point cloud of the object from the pixel height map and the estimated camera parameters.

16. The non-transitory computer-readable medium of claim 15, wherein generating, utilizing the one or more neural networks, the pixel height map and the perspective field representation comprises utilizing a dense representation neural network to jointly generate the pixel height map and the perspective field representation.

17. The non-transitory computer-readable medium of claim 15, wherein generating, utilizing the one or more neural networks, the pixel height map comprises utilizing a height prediction neural network to generate the pixel height map.

18. The non-transitory computer-readable medium of claim 15, wherein generating, utilizing the one or more neural networks, the perspective field representation comprises utilizing a dense field machine learning model to generate the perspective field representation.

19. The non-transitory computer-readable medium of claim 15, wherein generating, utilizing the perspective field guided pixel height reprojection model, the three-dimensional point cloud comprises:

generating the camera parameters from the pixel height map and the perspective field representation; and projecting two-dimensional points from the object into three-dimensions.

20. The non-transitory computer-readable medium of claim 19, wherein generating the camera parameters from the pixel height map and the perspective field representation comprises estimating a field-of-view, an extrinsic rotation matrix, a focal length, and an intrinsic matrix of a camera.

* * * * *